Figure 1:
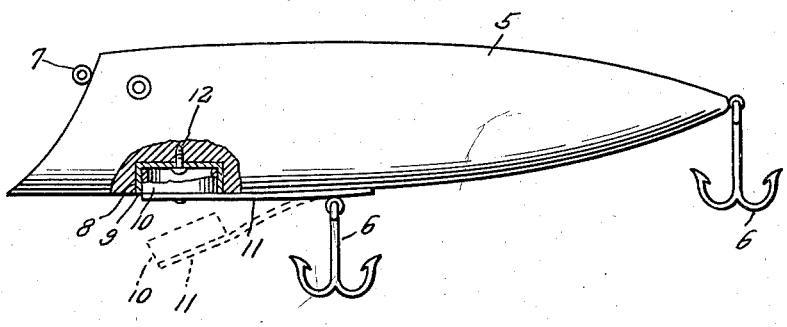

Aug. 21, 1945.  O. A. FISKAALI  2,383,246
FISH LURE
Filed June 21, 1943

Inventor
Otto A. Fiskaali

By Clarence A. O'Brien
and Harvey B. Jacobson
Attorneys

Patented Aug. 21, 1945

2,383,246

UNITED STATES PATENT OFFICE 2,383,246

FISH LURE

Otto A. Fiskaali, Fitchburg, Mass.

Application June 21, 1943, Serial No. 491,684

5 Claims. (Cl. 43—46)

This invention relates to new and useful improvements in fishing appliances and more particularly to a fish lure.

The principal object of this invention is to provide a fish lure with means for producing air bubbles for the purpose of simulating the expulsion of air by fish, this serving to lure other fish to the vicinity.

Other objects and advantages of the invention will become apparent to the reader of the following description.

In the drawing:

Figure 1 presents a side elevational view of the lure with a portion broken away to disclose the bubble producing means.

Figure 2:
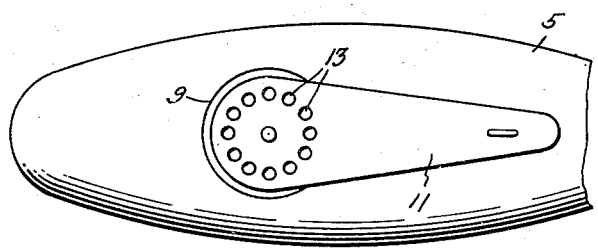

Figure 2 is a fragmentary bottom plan view of the lure.

Referring to the drawing wherein like numerals designate like parts, it can be seen that numeral 5 denotes an elongated fish lure body having hooks 6 suitably secured thereto and at appropriate places.

The forward end of the lure body is suitably shaped and provided with an eye or like means 7 to which a fish line can be attached.

The bottom of the lure is formed with a pocket 8 in which is placed a small container 9 and in which can snugly fit a small cup 10 carried by the free end portion of a strip spring 11. This strip spring 11 is secured at one end to the underside of the body 5, preferably by the securing means of one of the hook units 6.

The container 9 which, in fact, is a cap for the cup 10, may be secured by a small brad or screw 12 passing through an opening in the upper portion thereof and into the body 5.

The free end of the spring 11 and the bottom of the cup 10 are formed with water-receiving openings 13, to permit water to reach an oxygen tablet or other chemical element which is seated in the cup 10.

The object is to create bubbles in the water as the lure is pulled by the fishing line, this occurring when water contacts the chemical tablet in the cup 10.

While the foregoing specification sets forth the invention in specific terms, it is to be understood that numerous changes in shape, size, and materials may be resorted to without departing from the spirit and scope of the invention as claimed hereinafter.

Having described the invention, what is claimed as new is:

1. In a fish lure, a body, and a bubble-producing unit carried by the body, said unit comprising a cup-shaped structure adapted for holding an oxygen tablet or the like, said body having a recess therein for receiving the cup-shaped structure, and spring means retaining the cup-shaped structure in said recess.

2. A fish lure comprising a body having a recess in its underface, a spring arm attached to the body and having one end underlying the recess, and a chemical element retained in the recess by the free end of the spring arm.

3. A fish lure comprising a body having a recess in its underface, a chemical retaining cup removably held in the recess, and means for supporting the cup in the recess.

4. A fish lure comprising a body, and a bubble-producing unit carried by the body, said unit comprising a cup-shaped structure adapted for holding an oxygen tablet or the like, said body having a recess therein for receiving the cup-shaped structure, and a flat spring arm attached to the body and having one end arranged to retain the cup in the recess.

5. A fish lure comprising a body having a recess in its underface, a flat resilient arm having one end attached to the underface of the body and having its free end underlying the recess and provided with perforations, and a chemical retaining cup attached to the free end of the arm and fitting within the recess.

OTTO A. FISKAALI.